United States Patent
Kinage et al.

(10) Patent No.: US 10,447,493 B2
(45) Date of Patent: Oct. 15, 2019

(54) MAC AND PHYSICAL LAYER TECHNIQUES FOR ENABLING COMMUNICATIONS ON SHARED PHYSICAL MEDIUM WITH MULTI-DROP CAPABILITY

(71) Applicant: Honeywell International Inc., Morris Plains, NJ (US)

(72) Inventors: Amol Kinage, Bangalore (IN); Sai Krishnan Jagannathan, Bangalore (IN); Dinesh Kumar KN, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 162 days.

(21) Appl. No.: 15/342,897

(22) Filed: Nov. 3, 2016

(65) Prior Publication Data
US 2018/0034658 A1    Feb. 1, 2018

Related U.S. Application Data

(60) Provisional application No. 62/366,722, filed on Jul. 26, 2016.

(51) Int. Cl.
*H04L 12/40* (2006.01)
*H04B 1/38* (2015.01)
(Continued)

(52) U.S. Cl.
CPC ............ *H04L 12/40* (2013.01); *H04B 1/38* (2013.01); *H04L 7/0008* (2013.01);
(Continued)

(58) Field of Classification Search
CPC ............. H04L 12/40; H04L 12/4013; H04L 12/40019; H04L 12/40169; H04L 7/0008;
(Continued)

(56) References Cited

U.S. PATENT DOCUMENTS

| 4,890,222 A  * | 12/1989 | Kirk ........................ G06F 1/04 713/400 |
| 7,206,877 B1 * | 4/2007  | Doerenberg ............ H04L 67/12 710/100 |

(Continued)

OTHER PUBLICATIONS

International Search Report and Written Opinion of the International Searching Authority for International Application No. PCT/US2017/041480 dated Oct. 13, 2017, 12 pages.

*Primary Examiner* — Christopher P Grey (57) ABSTRACT

An apparatus includes at least one transceiver configured to transmit or receive at least one data signal over a shared physical medium. The physical medium includes a bus configured to be coupled to multiple devices including the apparatus and provides a multi-drop capability. The at least one transceiver is configured to transmit or receive the at least one data signal at a rate of more than 10 Mbps. In some embodiments, the apparatus includes a MAC driver configured to route network layer data over the physical medium. In other embodiments, the apparatus includes a MAC driver configured to control transmissions and receptions of network layer data over the physical medium by the at least one transceiver and a logic device configured to control physical layer signaling, interface with the MAC driver, enable the transmissions and receptions of the network layer data on the physical medium, and implement collision detection and avoidance.

19 Claims, 6 Drawing Sheets

(51) Int. Cl.
*H04L 7/00* (2006.01)
*H04L 29/08* (2006.01)

(52) U.S. Cl.
CPC ........ *H04L 7/0091* (2013.01); *H04L 12/4013* (2013.01); *H04L 12/40019* (2013.01); *H04L 12/40169* (2013.01); *H04L 67/12* (2013.01); *H04L 69/324* (2013.01); *H04L 2212/00* (2013.01)

(58) Field of Classification Search
CPC . H04L 7/0091; H04L 2212/00; H04L 69/324; H04L 67/12; H04B 1/38
See application file for complete search history.

(56) References Cited

U.S. PATENT DOCUMENTS

| | | |
|---|---|---|
| 7,408,961 B2 | 8/2008 | Kaku |
| 7,973,682 B2 | 7/2011 | Nanevicz |
| 8,098,692 B2 | 1/2012 | Albu et al. |
| 8,363,629 B1 | 1/2013 | Gurbuz et al. |
| 8,493,974 B1 | 7/2013 | Nelson et al. |
| 9,120,224 B2 | 9/2015 | Sanders et al. |
| RE46,005 E | 5/2016 | Mikhalev et al. |
| 2006/0190668 A1* | 8/2006 | Biran .................. G06F 13/4059 710/315 |
| 2008/0304486 A1* | 12/2008 | Graessley ............. H04L 65/608 370/392 |
| 2009/0161475 A1* | 6/2009 | Kim ........................ G11C 5/04 365/233.1 |
| 2013/0346987 A1* | 12/2013 | Raney ................... G06F 9/5044 718/102 |
| 2014/0362988 A1* | 12/2014 | Yang .................... H04L 63/0428 380/255 |
| 2015/0146742 A1* | 5/2015 | Maeda ..................... H04B 3/54 370/445 |
| 2015/0350159 A1 | 12/2015 | Verma et al. |

\* cited by examiner

MAC AND PHYSICAL LAYER TECHNIQUES FOR ENABLING COMMUNICATIONS ON SHARED PHYSICAL MEDIUM WITH MULTI-DROP CAPABILITY

CROSS-REFERENCE TO RELATED APPLICATION AND PRIORITY CLAIM

This application claims priority under 35 U.S.C. § 119(e) to U.S. Provisional Patent Application No. 62/366,722 filed on Jul. 26, 2016, which is hereby incorporated by reference in its entirety.

TECHNICAL FIELD

This disclosure relates generally to communication networks. More specifically, this disclosure relates to media access control (MAC) and physical layer techniques for enabling communications on a shared physical medium with multi-drop capability.

BACKGROUND

With the advent of the "Industrial Internet of Things" (IIOT), there is a desire to enable the use of the Transmission Control Protocol/Internet Protocol (TCP/IP) suite or other suitable protocols on numerous network-connected devices within industrial process control and automation systems. Supporting these types of network communications in standard industrial process control and automation devices (such as sensors, actuators, and controllers) would allow those devices to act as IIOT devices.

Communications used to support IIOT are often based on Ethernet or wireless technologies. Ethernet technologies typically support star and ring topologies with point-to-point links. However, Ethernet technologies for a shared medium (such as 10Base5 and 10Base2) are not preferred and are almost obsolete at this point. Also, supporting Ethernet in many industrial environments may require significant investment in industrial switches, or every IIOT device could require a built-in switch. Both can result in increased overall system costs. Moreover, wireless technologies are often not accepted for critical control applications.

While the use of Ethernet rings may avoid the requirement for external switches, Ethernet rings are generally not tolerant to multiple device failures. Two faults in the ring can completely break communications in the ring, and the ring can be disturbed whenever a device is inserted into or removed from the ring. As a result, Ethernet rings may be undesirable in industrial process control and automation systems, particularly with critical control applications where more than one fault needs to be safely handled. While TCP/IP can be used on a shared RS485 bus, the slower speeds provided by RS485 may not meet some industrial control needs.

SUMMARY

This disclosure provides media access control (MAC) and physical layer techniques for enabling communications on a shared physical medium with multi-drop capability.

In a first embodiment, an apparatus includes at least one transceiver configured to transmit or receive at least one clock signal and at least one data signal over a shared physical medium. The shared physical medium includes a bus configured to be coupled to multiple devices including the apparatus and provides a multi-drop capability. The at least one transceiver is configured to transmit or receive the signals at a rate of more than 10 megabits per second (Mbps). The apparatus also includes a MAC driver configured to exchange network layer data over the shared physical medium.

In a second embodiment, a method includes transmitting or receiving at least one clock signal and at least one data signal over a high-speed shared physical medium using at least one transceiver. The shared physical medium includes a bus coupled to multiple devices and provides a multi-drop capability. The at least one transceiver is configured to transmit or receive the signals at a rate of more than 10 Mbps. The method also includes exchanging network layer data over the shared physical medium using a MAC driver.

In a third embodiment, an apparatus includes at least one transceiver configured to transmit or receive at least one data signal over a shared physical medium. The shared physical medium includes a bus configured to be coupled to multiple devices including the apparatus and provides a multi-drop capability. The at least one transceiver is configured to transmit or receive the at least one data signal at a rate of more than 10 Mbps. The apparatus also includes a MAC driver configured to control transmissions and receptions of network layer data over the shared physical medium by the at least one transceiver. The apparatus further includes a logic device configured to control physical layer signaling and interface with the MAC driver. The logic device is configured to enable the transmissions and receptions of the network layer data on the shared physical medium and to implement collision detection and avoidance.

In a fourth embodiment, a method includes transmitting or receiving at least one data signal over a high-speed shared physical medium using at least one transceiver. The shared physical medium includes a bus coupled to multiple devices and provides a multi-drop capability. The at least one transceiver is configured to transmit or receive the at least one data signal at a rate of more than 10 Mbps. The method also includes controlling transmissions and receptions of network layer data over the shared physical medium by the at least one transceiver using a MAC driver. The method further includes enabling the transmissions and receptions of the network layer data on the shared physical medium using a logic device that controls physical layer signaling, interfaces with the MAC driver, and implements collision detection and avoidance.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, supporting the Transmission Control Protocol/Internet Protocol (TCP/IP) suite or other suitable protocols in industrial process control and automation devices and systems is often difficult, costly, or undesirable using conventional Ethernet or wireless technologies. This disclosure provides topologies that can enable high-speed Ethernet-based communications over shared physical media of short or long spans that support multi-drop capabilities. Among other things, this allows industrial process control and automation devices (such as sensors, actuators, and controllers) to more easily and cost-effectively be configured to function as "Industrial Internet of Things" (IIOT) devices. Moreover, these topologies can be used to support systems such as multi-drop backplane communication systems, and these systems can support a large number of devices sharing a common physical medium. The ability of multiple devices to share a common physical medium can greatly simplify installation and maintenance of the devices and the overall system, which can also reduce the associated costs. These topologies can be useful in a number of environments, such as in industrial process control and automation systems or other industrial applications in which it is desired to use Internet Protocol (IP) communications as the default networking standard.

Figure 1:
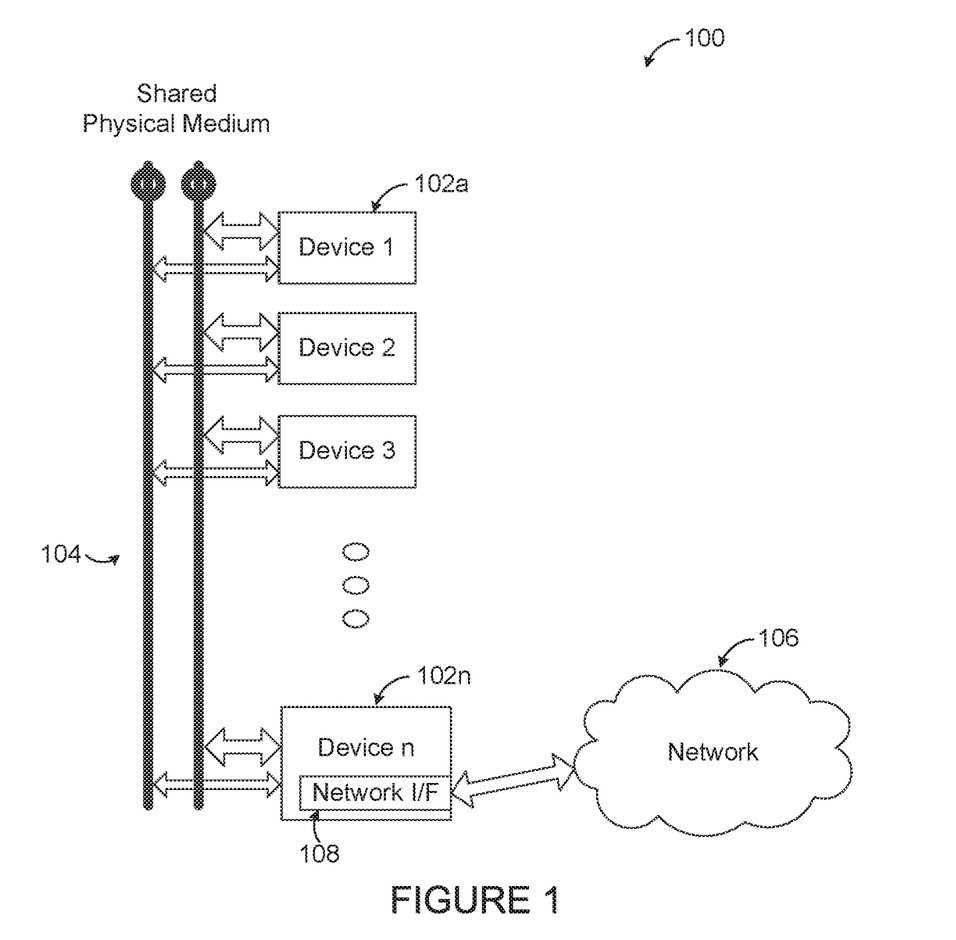
FIG. 1 illustrates an example system supporting media access control (MAC) and physical layer techniques that enable communications on a shared physical medium with multi-drop capability according to this disclosure.

FIG. 1 illustrates an example system 100 supporting media access control (MAC) and physical layer techniques that enable communications on a shared physical medium with multi-drop capability according to this disclosure. As shown in FIG. 1, the system 100 includes multiple devices 102a-102n and a shared physical medium 104. Each device 102a-102n generally denotes a computing device or other device that performs any of a wide variety of functions and that communicates over the shared physical medium 104. The functionality of the devices 102a-102n can vary as needed or desired.

In some embodiments, each device 102a-102n could denote a device used in an industrial process control and automation system, such as a sensor for measuring one or more characteristics of at least one industrial process, an actuator for altering one or more characteristics of at least one industrial process, or a controller for controlling at least one industrial process. As specific examples, the devices 102a-102n could denote "smart" transmitters, single-loop process controllers, or intelligent input/output (I/O) units. As an even more specific example, each device 102a-102n could denote an intelligent field I/O terminal designed to (i) perform process control functions, (ii) provide I/O, and (iii) provide an intrinsic safety barrier. The devices 102a-102n could be installed in large numbers, such as in one or more junction boxes, and be IP-enabled.

Note that any other or additional devices 102a-102n could be used in the system 100. Also note that any suitable number of devices 102a-102n could be used in the system 100 and coupled to the shared physical medium 104. In some embodiments, up to thirty-two devices 102a-102n could be coupled to the same shared physical medium 104, although other numbers of devices could also be used.

The shared physical medium 104 denotes a physical transmission medium over which data, clock signals, or other information can be transmitted and received. The shared physical medium 104 could be implemented in a number of ways and includes any suitable communication medium supporting the transport of signals between multiple devices. For example, the shared physical medium 104 could be implemented using one or more electrical or optical conductors in a backplane or other structure to which the devices 102a-102n are inserted or otherwise connected. The shared physical medium 104 could also be implemented using at least one cable coupling the devices 102a-102n, where the cable(s) can contain one or more electrical or optical conductors. The conductors of the shared physical medium 104 could be formed in any suitable manner, such as by using one or more copper traces or wires, shielded twisted pairs, or fiber optic connections. The shared physical medium 104 may or may not be redundant, and the shared physical medium 104 could support synchronous or asynchronous communications. In this example, the shared physical medium 104 is formed using two electrical conductors, although the shared physical medium 104 could be formed using any other suitable number of electrical or optical conductors. The shared physical medium 104 could also support any suitable data transfer rate, such as 10 megabits per second (Mbps), 20 Mbps, 50 Mbps, 100 Mbps, 300 Mbps, 1000 Mbps, or more.

Any number of signaling techniques could be used to transmit and receive information over the shared physical medium 104. For example, the shared physical medium 104 could include multiple conductors over which multipoint low-voltage differential signaling (M-LVDS) or other signals can be transported. "Low-voltage differential signaling" indicates that lower-voltage signals are sent over multiple conductors of the shared physical medium 104, and differences between the lower-voltage signals are used to represent information. "Multipoint" indicates that a single one of the devices 102a-102n can communicate with multiple other devices using the shared physical medium 104. M-LVDS may be desirable since it can be used to support data transmissions at higher speeds, such as 10 Mbps, 100 Mbps, or more. Speeds such as this can be beneficial when transporting TCP/IP frames or other frames of information. A shared physical medium 104 based on M-LVDS could comply with a suitable standard, such as EIA/TIA 899. In particular embodiments, the shared physical medium 104 can be operated in a half-duplex synchronous mode with a minimum data rate of 10 Mbps or 20 Mbps. Moreover, M-LVDS can provide higher immunity to noise and electromagnetic interference (EMI) compared to other technologies, making it suitable for industrial applications. However, any other suitable protocols and/or data rates could be used with the shared physical medium 104. Other example types of signaling techniques that can be used over serial shared physical media could include RS422 and RS485.

In some embodiments, at least one of the devices 102a-102n supports communications with at least one external network 106, such as at least one IP network. The external network 106 could denote any suitable network or combination of networks, such as at least one private IP network used in an industrial process control and automation system or other system or at least one public IP network.

To support communications with the external network 106, at least one of the devices 102a-102n can include at least one network interface 108. Each network interface 108 denotes any suitable structure facilitating communications with an external network, such as an Ethernet switch. While not shown, a single device could include multiple network interfaces 108, which communicate over different connections with the same external network 106 or different external networks 106. The network interface(s) 108 could be used to support various functions, such as those related to redundancy. Although a single device (device 102*n*) is shown here as including a single network interface 108, multiple (possibly all) devices 102*a*-102*n* could each include at least one network interface 108.

As described in more detail below, each device 102*a*-102*n* supports a MAC and/or physical layer technique that enables communications on a serial bus or other bus formed by the shared physical medium 104 with multi-drop capability. In a "multi-drop" type of topology, multiple components are connected to a common communication path (the electrical, optical, or other conductor or conductors of the shared physical medium 104), and some arbitration process can be used to determine which device sends information at any specific point in time. Devices that are not sending information can listen for incoming data over the common communication path. The devices can support any suitable communication protocol(s), such as the TCP/IP suite or PROFINET.

Communications over the shared medium 104 with multi-drop capability can be supported by modifying a physical (PHY) layer and/or a MAC (data link) layer of the devices. This could be achieved by modifying a MAC driver, a MAC interface, a PHY layer, or any combination thereof. The MAC and physical layer techniques could be supported using software/firmware approaches or hardware approaches. For example, a data link layer can be used to transport TCP/IP packets or other data over the shared physical medium 104, and each device 102*a*-102*n* could include a MAC driver that enables the routing of the data on the shared physical medium 104. This is one example of a software/firmware-based approach. As another example, a logic device used to implement a PHY layer can interface with a MAC driver, and the logic device can enable the transmission of TCP/IP packets or other data on the shared physical medium 104. This is one example of a hardware-based approach.

Depending on the implementation, in some embodiments, one of the devices 102*a*-102*n* on the bus could function as a master device, while the remaining devices 102*a*-102*n* on the bus could function as slave devices. The master device controls access to the shared physical medium 104, such as by using a token passing scheme on a round-robin basis or other technique. Any device 102*a*-102*n* may be capable of becoming the master device in case of a failure of the current master device. Also, device addresses can be used by the devices 102*a*-102*n* to communicate via the shared physical medium 104. Device addresses could be physically allotted in various ways, such as electrically on a carrier board slot (like where the slot position works as a device address) or mechanically (like by using a rotary switch). Device addresses could also be assigned in software/firmware or in any other suitable manner.

Additional details regarding the use of MAC and physical layer techniques for enabling communications on a shared physical medium with multi-drop capability are provided below. Note that while often described as being used as part of an industrial process control and automation system, the MAC and physical layer techniques described below could be used in any other suitable device or system.

Although FIG. 1 illustrates one example of a system 100 supporting MAC and physical layer techniques that enable communications on a shared physical medium with multi-drop capability, various changes may be made to FIG. 1. For example, a system could include any number of shared physical media forming any number of buses for devices. Also, any suitable number of devices could be coupled to each bus.

Figure 2:
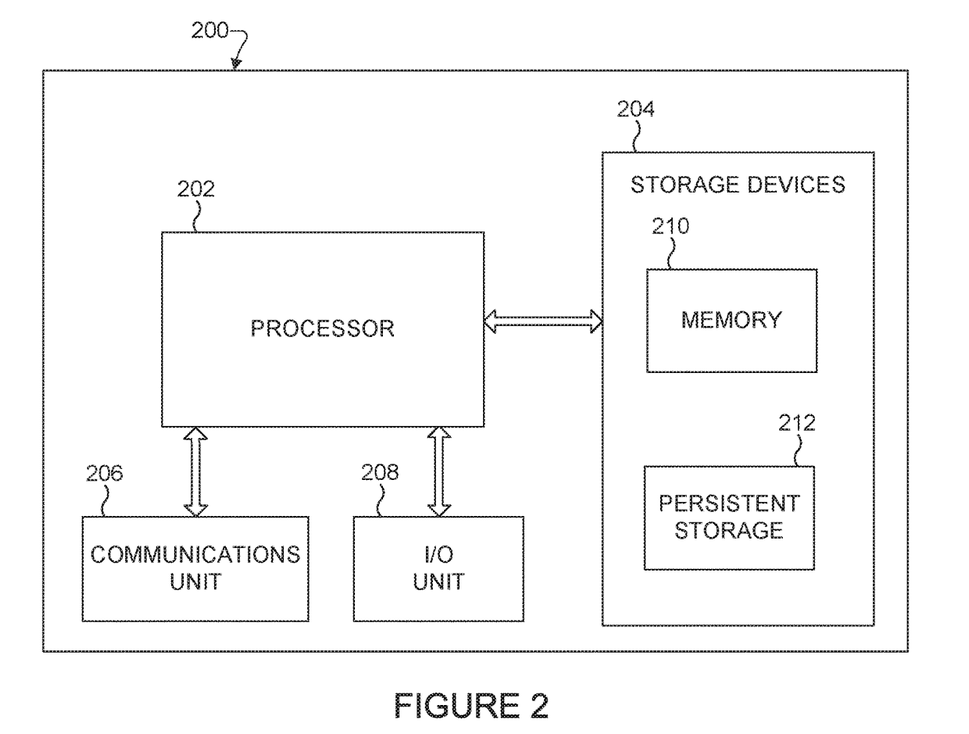
FIG. 2 illustrates an example device for supporting MAC and physical layer techniques that enable communications on a shared physical medium with multi-drop capability according to this disclosure.

FIG. 2 illustrates an example device 200 for supporting MAC and physical layer techniques that enable communications on a shared physical medium with multi-drop capability according to this disclosure. For ease of explanation, the device 200 in FIG. 2 can represent an example implementation of the devices 102*a*-102*n* of FIG. 1. Note, however, that the devices 102*a*-102*n* could be implemented in any other suitable manner and that the device 200 could be used in any other suitable system.

As shown in FIG. 2, the device 200 includes at least one processor 202, at least one storage device 204, at least one communications unit 206, and at least one I/O unit 208. Each processor 202 can execute instructions, such as those that may be loaded into a memory 210. Each processor 202 denotes any suitable processing device, such as one or more microprocessors, microcontrollers, digital signal processors (DSPs), application specific integrated circuits (ASICs), field programmable gate arrays (FPGAs), or discrete logic devices.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one MAC module supporting communications over at least one serial bus or other shared physical medium using TCP/IP, PROFINET, or other suitable protocol(s). As another example, the communications unit 206 could include a module having at least one logic device providing a physical layer that supports communications over at least one serial bus or other shared physical medium using TCP/IP, PROFINET, or other suitable protocol(s). Note that the device 200 could support both MAC and physical layer techniques allowing communications over a shared physical medium, or the device 200 could support only one of these techniques. The communications unit 206 could further include at least one network interface 108 supporting communications with one or more external networks.

The I/O unit 208 optionally allows for input and output of data. For example, the I/O unit 208 may provide a connection for user input through a keyboard, mouse, keypad, touchscreen, or other suitable input device. The I/O unit 208 may also send output to a display, printer, or other suitable output device. The I/O unit 208 may further allow the device 200 to interact with other local devices.

Although FIG. 2 illustrates one example of a device 200 supporting MAC and physical layer techniques that enable communications on a shared physical medium with multi-drop capability, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device. In fact, the devices 102a-102n in FIG. 1 need not represent computing devices at all and could represent any other suitable devices that can support a MAC or physical layer technique for communicating over a shared medium.

Figure 3:
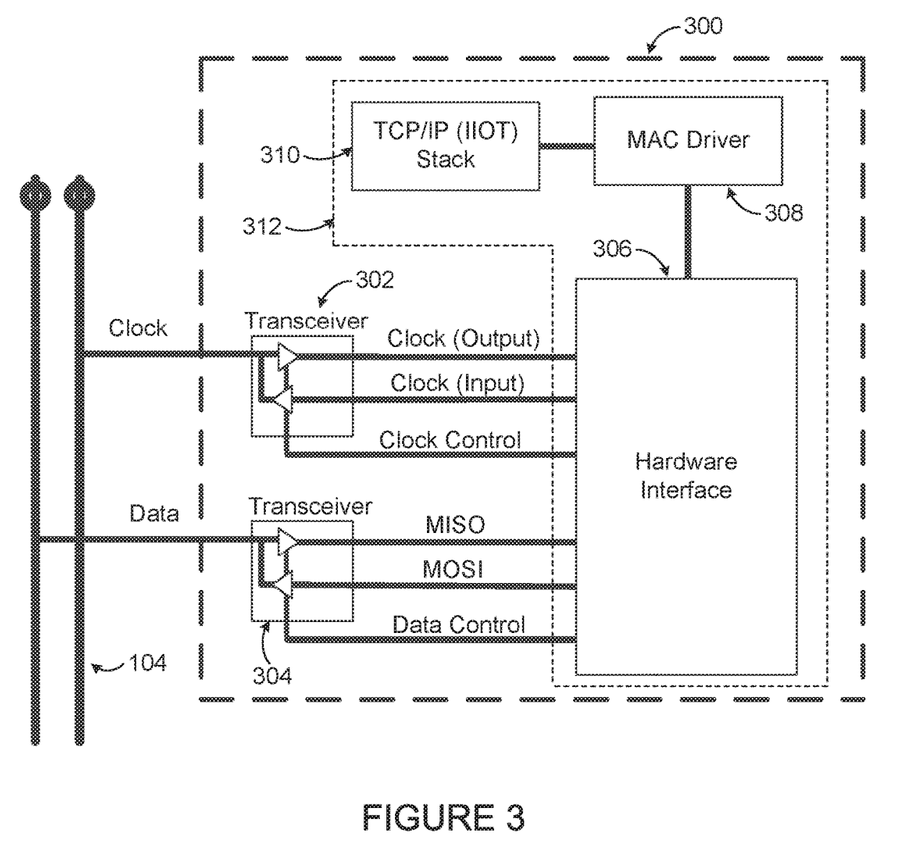
FIGS. 3 and 4 illustrate example MAC and physical layer techniques that enable communications on a shared physical medium with multi-drop capability according to this disclosure.
Figure 4:
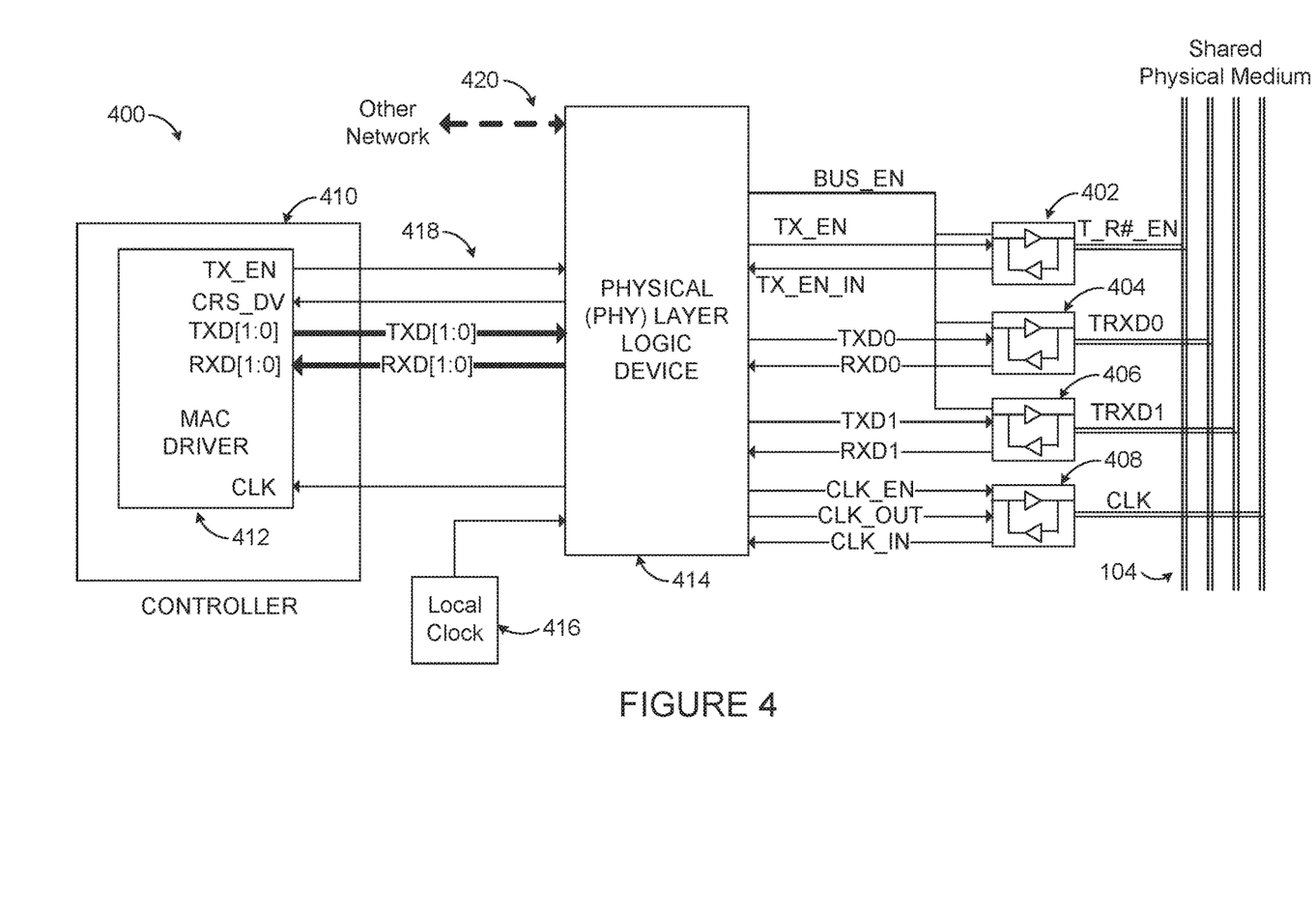

FIGS. 3 and 4 illustrate example MAC and physical layer techniques that enable communications on a shared physical medium with multi-drop capability according to this disclosure. In particular, FIG. 3 illustrates an example MAC technique for enabling communications on a shared physical medium with multi-drop capability, and FIG. 4 illustrates an example physical layer technique for enabling communications on a shared physical medium with multi-drop capability.

As shown in FIG. 3, an example MAC module 300 enables communications on a shared physical medium with multi-drop capability using a modified data link layer (which denotes layer 2 of the OSI reference stack). As noted above, the MAC module 300 could form part of the communications unit 206 in the device 200. Note, however, that the MAC module 300 could be implemented in any other suitable manner and that the MAC module 300 could be used in any suitable device or system that is to be coupled to a shared physical medium.

As shown in FIG. 3, the MAC module 300 includes two transceivers 302-304, each of which is able to transmit or receive signals over the shared physical medium 104. In this example, the transceiver 302 is used to transmit or receive clock signals over the shared physical medium 104, and the transceiver 304 is used to transmit or receive data signals over the shared physical medium 104. The direction of communication by the transceiver 302 could vary depending on whether the MAC module 300 is used in a master or slave device. For example, the transceiver 302 could transmit a clock signal over the shared physical medium 104 when used in a master device, and the transceiver 302 could receive a clock signal over the shared physical medium 104 when used in a slave device. Similarly, the transceiver 304 can be used to transmit or receive data depending on the device's mode of operation.

Each transceiver 302-304 includes any suitable structure for transmitting and receiving information. In some embodiments, each transceiver 302-304 includes any suitable structure for transmitting and receiving information using low-voltage differential signaling or other suitable communication protocol. In particular embodiments, the transceivers 302-304 could denote M-LVDS or other serial transceivers.

A hardware interface 306 provides an interface for coupling to the transceivers 302-304. For example, the hardware interface 306 could transmit a clock signal to the transceiver 302 or receive a clock signal from the transceiver 302 based on a clock control signal. Similarly, the hardware interface 306 could transmit a data signal to the transceiver 304 or receive a data signal from the transceiver 304 based on a data control signal. The hardware interface 306 includes any suitable structure for interfacing with one or more transceivers.

The MAC module 300 here also includes a MAC driver 308 and a TCP/IP stack 310. The MAC driver 308 generally operates to control access to the shared physical medium 104. For example, the MAC driver 308 can control whether the MAC module 300 is transmitting or receiving data and clock signals, such as by generating the clock and data control signals.

The MAC driver 308 can also frame and decode TCP/IP packets or other data. For example, the MAC driver 308 could receive data link frames sent over the shared physical medium 104, extract the TCP/IP packets from the data link frames, and pass the TCP/IP packets to the TCP/IP stack 310. Similarly, the MAC driver 308 could wrap outbound TCP/IP packets from the TCP/IP stack 310 in data link frames that are sent over the shared physical medium 104, such as when a master device sends a token to another device over the shared physical medium 104. The MAC driver 308 could also use an inter-frame gap to allow a device 102a-102n to synchronize its operations with the bus. In addition, the MAC driver 308 could monitor master frames to detect the presence or absence of a master device. In case of failure of the current master device, another device (such as the device with the next highest or lowest physical address) can take the master role and start controlling the shared physical medium 104. Note that this modifies the operation of current conventional MAC drivers.

The TCP/IP stack 310 denotes various layers that support functions for using the TCP and IP protocols. For example, the TCP/IP stack 310 could support link layer, Internet layer, transport layer, and application layer functions. The specific functions performed by each layer in the TCP/IP stack 310 can vary depending on the specific device in which the TCP/IP stack 310 is used. Note that while a TCP/IP stack 310 is shown here, other suitable stacks could be used, such as any other stack supporting IIOT (like a PROFINET stack).

The MAC driver 308 and the TCP/IP stack 310 could each be implemented in any suitable manner. For example, the MAC driver 308 and the TCP/IP stack 310 could each be implemented using software or firmware instructions that are executed by one or more processors, such as the processor(s) 202 of the device 200. In particular embodiments, the hardware interface 306, MAC driver 308, and TCP/IP stack 310 (or other stack) could be implemented using at least one programmable device 312, such as an FPGA, an ASIC, a complex programmable logic device (CPLD), discrete digital logic, or a microcontroller.

The MAC driver 308 here could be implemented in software or firmware that defines the data link layer, which interfaces with the TCP/IP stack (or other stack) 310 and specific hardware that defines the physical layer. The interface between the MAC driver 308 and the hardware could use any suitable communication protocols, such as one or more Serial Peripheral Interfaces (SPIs), Universal Asynchronous Receiver/Transmitter (UART) interfaces, or Controller Area Network (CAN) interfaces. The new data link layer can perform functions to help avoiding collision using any suitable techniques, such as master/slave communications, time triggering, or token master configurations. The hardware interface 306 enables transmission of data link layer packets on the shared physical medium 104 using an appropriate physical layer signaling, such as M-LVDS. The specific hardware interface 306 that is used in FIG. 3 can vary depending on the type of shared physical medium 104, such as when the shared physical medium 104 can be implemented using copper, shielded twisted pairs, or optical fibers.

The MAC module 300 here could be designed to support various functions. Any individual function or combination of functions described below could be supported by the MAC module 300. The MAC module 300 can support the transmission and/or reception of data link layer packets over a high-speed shared physical medium. The high-speed shared physical medium could include a serial or other bus, and the physical medium may or may not be redundant and may be operated in synchronous or asynchronous mode. The MAC module 300 can be capable of interfacing with any standard TCP/IP stack or other IIOT protocol stack(s). The MAC module 300 can be based on a master-slave architecture, and the MAC module 300 on any device can be capable of becoming a master. The MAC module 300 in a master device can be capable of identifying all devices on the network at runtime, and the MAC module 300 can be capable of supporting communications between slave devices without the master device repeating a frame. The MAC module 300 could support frame integrity checks and retry mechanisms, as well as anti-jabber functions to prevent devices from hogging the network. The MAC module 300 can further include one or more security features (such as encryption at the link layer itself) and can provide diagnostics and statistics on network operations.

Access to the shared physical medium 104 by the MAC module 300 could be controlled in any suitable manner. For example, as described above, the master device could control access to the shared physical medium 104 using a token passing scheme on a round-robin basis, meaning the master device controls the passing of a token amongst the various devices coupled to the shared physical medium 104 and the device with the token can use the shared physical medium 104. Other types of access control techniques could also be used, such as query-response based protocols.

As shown in FIG. 4, an example module 400 enables communications on a shared physical medium with multidrop capability using a modified physical layer (which denotes layer 1 of the OSI reference stack). As noted above, the module 400 could form part of the communications unit 206 in the device 200. Note, however, that the module 400 could be implemented in any other suitable manner and that the module 400 could be used in any suitable device or system that is to be coupled to a shared physical medium.

As shown in FIG. 4, the module 400 includes four transceivers 402-408, each of which is able to transmit or receive signals over the shared physical medium 104. In this example, the transceiver 402 is used to transmit a transit enable (TX_EN) signal to other devices or receive a transmit enable signal (TX_EN_IN) from another device over the physical medium 104. The transit enable signals can be used by the devices to control which device can transmit data over the physical medium 104. The transceivers 404 and 406 are used to transmit or receive two-bit data signals, and the transceiver 408 is used to transmit or receive clock signals. The direction of communication by the transceivers 402-408 could vary depending on whether the module 400 is transmitting or receiving.

Each transceiver 402-408 includes any suitable structure for transmitting and receiving information. In some embodiments, each transceiver 402-408 includes any suitable structure for transmitting and receiving information using low-voltage differential signaling or other protocol. In particular embodiments, the transceivers 402-408 could denote M-LVDS or other serial transceivers.

A controller 410 in the module 400 implements or operates in conjunction with a MAC driver 412. The MAC driver 412 generally operates to control access to the shared physical medium 104, such as by controlling whether the module 400 is transmitting or receiving data and clock signals. Unlike in FIG. 3, however, the MAC driver 412 could denote a standard Ethernet MAC driver, although a custom MAC driver could also be used. The controller 410 denotes any suitable processing or control device(s) for controlling the operation of the module 400 or a larger device and could, in some embodiments, denote the processor(s) 202 of the device 200. The MAC driver 412 could be implemented in any suitable manner, such as by using software or firmware instructions that are executed by one or more processors (such as the processor(s) 202 of the device 200). Note that while the MAC driver 412 is shown here as being implemented within the controller 410, the MAC driver 412 could also be implemented external to the controller 410.

A logic device 414 communicatively couples the MAC driver 412 and the transceivers 402-408. The logic device 414 operates to control the transmission or reception of data link layer frames using physical layer signaling on the shared physical medium 104 using the transceivers 402-408. The logic device 414 also performs collision detection and avoidance for the shared physical medium 104. For example, the logic device 414 can detect collisions between transmissions and receptions over the shared physical medium 104, meaning the logic device 414 can detect when the module 400 transmits over the shared physical medium 104 while another device is also transmitting over the shared physical medium 104. The logic device 414 can also perform operations to help avoid further collisions.

The logic device 414 includes any suitable structure for controlling physical layer signaling and performing collision detection and avoidance, such as an FPGA, an ASIC, a CPLD, discrete digital logic, or a microcontroller. The logic device 414 could also use any suitable technique for detecting or avoiding collisions, such as by using a carrier sense multiple access with collision detection (CSMA/CD) technique.

The logic device 414 operates here using at least one clock signal from a local clock source 416. The local clock source 416 denotes any suitable source of one or more clock signals, such as an oscillator. Any suitable clock signals could be provided by the local clock source 416, such as a 50 MHz clock signal.

An interface 418 between the logic device 414 and the MAC driver 412 could have any suitable form. In some embodiments, the interface 418 denotes a Media Independent Interface (MII), a Reduced Media Independent Interface (RMII), or a Gigabit Media Independent Interface (GMII). The interface 418 here supports the transport of a transmit enable (TX_EN) signal indicating whether transmission of outgoing data is enabled, a carrier sense data valid (CRS_DV) signal indicating whether a collision has occurred, and transmit data (TXD) and receive data (RXD) signals. Note, however, that the interface 418 could be implemented with any kind of media independent interface or other interface, and the number of transceivers used for communications can be decided based on system constraints or other considerations. As particular examples, the module 400 could support a two-bit data interface (TX0/RX0 and TX1/RX1) operating at a 50 MHz speed, a one-bit data interface (TX0/RX0 or TX1/RX1) operating at a 100 MHz speed, or a four-bit data interface (with four data transceivers) operating at a 25 MHz speed. Any other suitable interface(s) 418 could be used between the logic device 414 and the MAC driver 412, such as one or more SPIs or UART interfaces.

The logic device 414 could be designed to support various functions. Any individual function or combination of functions described below could be supported by the logic device 414. The logic device 414 can support the transmission and/or reception of data link layer packets over a high-speed shared physical medium. The high-speed shared physical medium could include a serial or other bus, and the physical medium may or may not be redundant and may be operated in synchronous or asynchronous mode. The logic device 414 can be capable of interfacing with any standard or custom MAC driver, which could interface with any standard TCP/IP stack or other IIOT protocol stack(s). The logic device 414 could support frame integrity checks and retry mechanisms, as well as anti-jabber functions to prevent devices from hogging the network. The logic device 414 can further include one or more security features (such as encryption at the link layer itself) and can provide diagnostics and statistics on network operations.

Note that in FIGS. 3 and 4, the number of bits transmitted over the shared physical medium 104 affects the bandwidth of the shared physical medium 104. In FIG. 3, the MAC module 300 is shown as transmitting or receiving a single clock signal and a single data signal over the shared physical medium 104. Adding one or more additional electrical or optical conductors to the shared physical medium 104 would allow the MAC module 300 to transmit more one or more additional data signals over the shared physical medium 104. Similarly, in FIG. 4, the module 400 is shown as transmitting or receiving a single clock signal and two data signals over the shared physical medium 104. A single data signal could be sent over one conductor (one channel) of the shared physical medium 104, or one or more additional data signals could be sent over one or more additional conductors (additional channels) of the shared physical medium 104. In some embodiments, each of the modules 300 and 400 could therefore interface with a single-conductor shared physical medium 104 or a multi-conductor shared physical medium 104, thereby supporting a scalable bandwidth over one or multiple channels.

In some embodiments, it is possible to use the logic device 412 to support other functions, such as a bridging or translation function. For example, the logic device 412 could include at least one interface 420 to at least one other network. The other network could denote a network formed by another shared physical medium and another set of devices, and the interface 420 could be coupled to the other shared physical medium. If the other network uses the same protocol(s) and transmission scheme(s) as the shared physical medium 104, the interface 420 could bridge the two physical media. If the other network uses different protocols or transmission schemes than the shared physical medium 104, the logic device 412 could translate between the two physical media. As a particular example, the logic device 412 could translate between an M-LVDS or other serial protocol and an optical protocol. The ability to provide a bridging or translation function helps to extend a length of the overall span of a bus over which devices can communicate. In a similar way, the logic device 412 could act as a buffer for a bus formed by the shared physical medium 104 and the shared physical medium of another network. This can again help to extend the length of the overall span of the bus over which devices can communicate, as well as increase the number of devices that could be connected to the bus.

Although FIGS. 3 and 4 illustrate examples of MAC and physical layer techniques that enable communications on a shared physical medium with multi-drop capability, various changes may be made to FIGS. 3 and 4. For example, various components in FIGS. 3 and 4 could be combined, further subdivided, or omitted and additional components could be added according to particular needs. Also, it may be possible for a single transceiver to transmit or recover both clock and data signals. Further, as noted above, the number of conductors in the shared physical medium 104 (and therefore the number of transceivers used to communicate using the shared physical medium 104) could vary as needed or desired. In addition, FIGS. 3 and 4 illustrate example implementations where software/firmware or hardware can be used to enable communications on a shared physical medium with multi-drop capability, although other structures that operate in the same or similar manner could be used.

Figure 5:
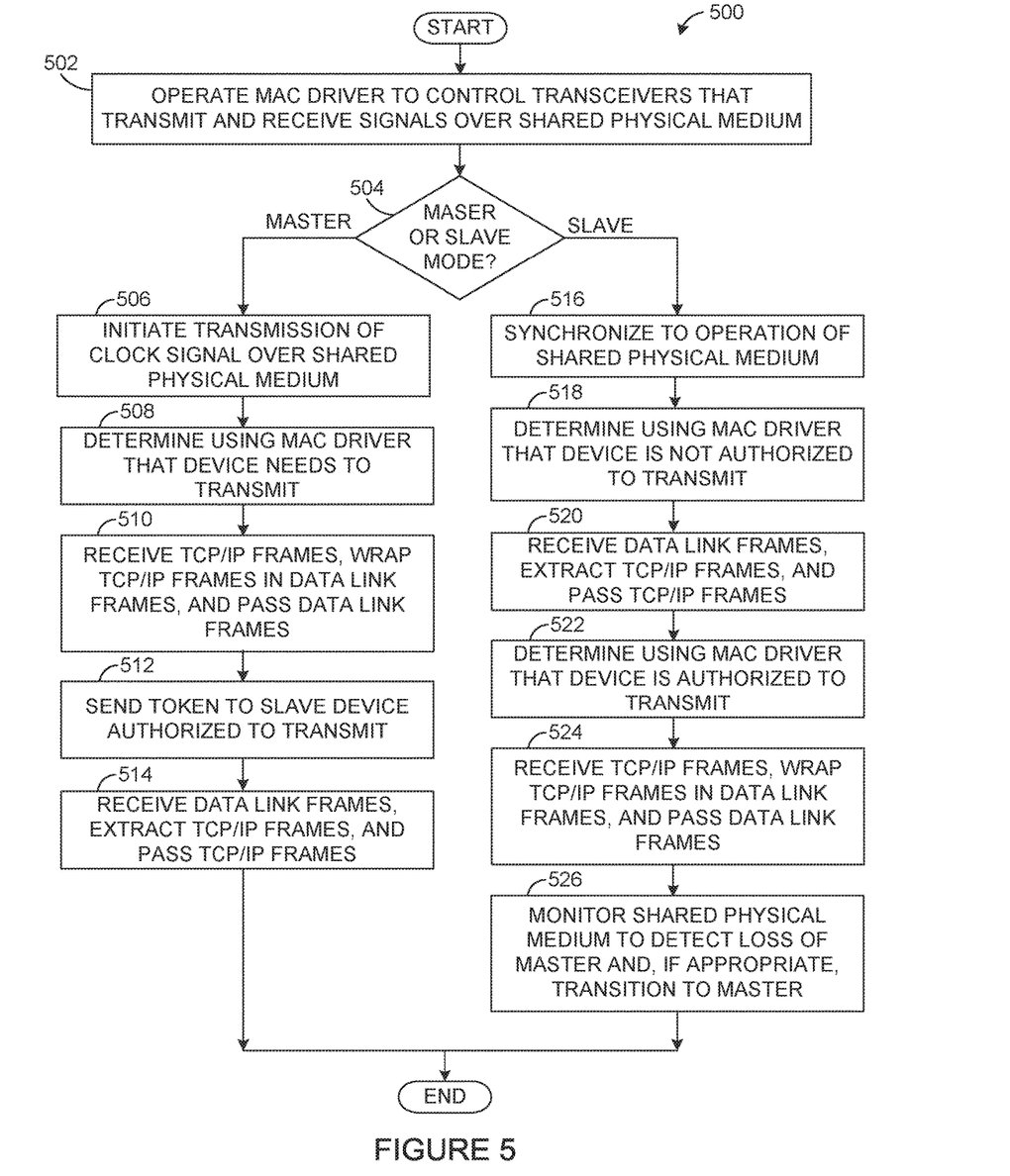
FIGS. 5 and 6 illustrate example methods for enabling communications on a shared physical medium with multi-drop capability according to this disclosure.
Figure 6:
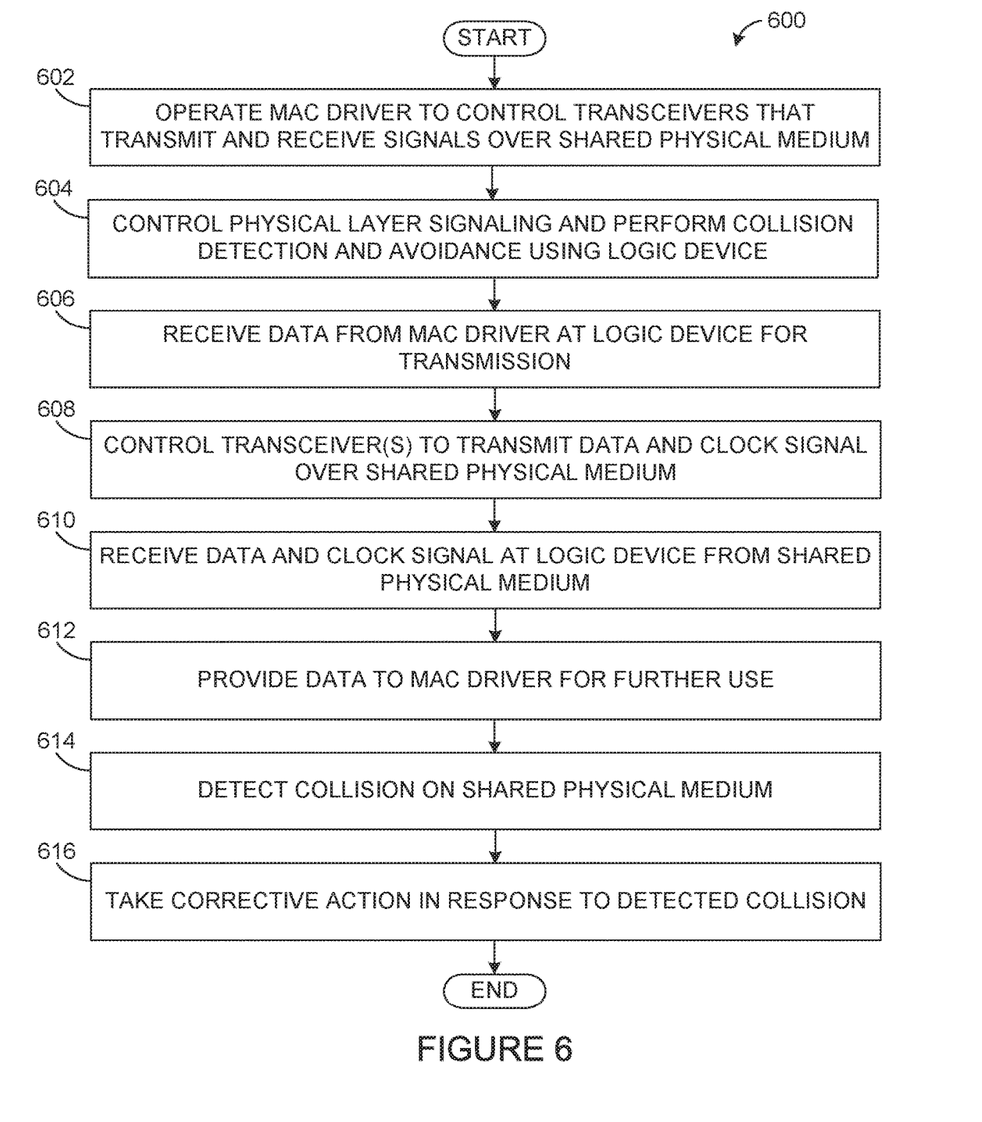

FIGS. 5 and 6 illustrate example methods for enabling communications on a shared physical medium with multi-drop capability according to this disclosure. In particular, FIG. 5 illustrates an example method 500 using a MAC technique to enable communications on a shared physical medium with multi-drop capability, and FIG. 6 illustrates an example method 600 using a physical layer technique to enable communications on a shared physical medium with multi-drop capability. For ease of explanation, the methods 500 and 600 are described as being performed using the modules 300 and 400 in the system 100, although each method 500 and 600 could be used with any suitable device or system that is to be coupled to a shared physical medium.

As shown in FIG. 5, the method 500 includes operating a MAC driver to control one or more transceivers at step 502. This could include, for example, the processor 202 or programmable device 312 of any of the devices 102a-102n executing software or firmware instructions implementing the MAC driver 308. The MAC driver 308 operates to control the transmission and reception of signals by the transceivers 302-304 over the shared physical medium 104.

The operation of the MAC driver (and therefore the device) varies depending on whether the device is operating in a master mode or a slave mode as determined at step 504. When operating in the master mode, the MAC driver performs various actions that help to control the use of the shared physical medium. For example, the MAC driver initiates transmission of a clock signal over the shared physical medium at step 506. This could include, for example, the MAC driver 308 outputting a clock control signal that causes the transceiver 302 to transmit a clock signal over a conductor of the shared physical medium 104. The clock signal could originate from any suitable source.

When the device is in the master mode, the MAC driver could also determine that the device needs to transmit data at step 508 and transmit the data over the shared physical medium at step 510. This could include, for example, the MAC driver 308 outputting a data control signal that causes the transceiver 304 to transmit a data signal over a conductor of the shared physical medium 104. This could also include the MAC driver 308 receiving TCP/IP (or other) frames, wrapping the frames in data link frames, and passing the data link frames to the transceiver 304 for transmission over the shared physical medium 104. The TCP/IP (or other) frames could be received by the MAC driver 308 from any suitable source, such as from the TCP/IP stack 310 or other IIOT stack. The transmitted data could denote any suitable information, such as commands or other information needed by other devices 102a-102n for operation or data sent to a device 102n having a network interface 108 for communication over a network 106.

The device operating in the master mode can further transmit information controlling which other devices can transmit over the shared physical medium. For example, the MAC driver can transmit a token to a slave device at step 512. This could include, for example, the MAC driver 308 creating a suitable data link message containing a token for a slave device 102*a*-102*n*. The token can authorize the slave device to transmit data over the shared physical medium 104, such as for a specified period of time.

In addition, the MAC driver receives data sent over the shared physical medium (such as from a slave device) at step 514. This could include, for example, the MAC driver 308 receiving data link frames over the shared physical medium 104, extracting TCP/IP (or other) frames from the data link frames, and passing the TCP/IP (or other) frames to a higher layer, such as in the TCP/IP stack 310.

Note that this represents examples of the types of operations that the MAC driver 308 could perform in a device 102*a*-102*n* operating in the master role. Various other operations could also be performed by the master device, such as anti-jabber, security/encryption, or other functions described above.

When operating in the slave mode, the MAC driver performs various actions that help to enable use of the shared physical medium as controlled by a master device. For example, the MAC driver synchronizes to operation of the shared physical medium at step 516. This could include, for example, the MAC driver 308 receiving the clock signal from the shared physical medium 104 via the transceiver 302. This could also include the MAC driver 308 using an inter-frame gap in communications on the shared physical medium 104.

When the MAC driver determines that the device operating in the slave mode is not authorized to transmit at step 518, the MAC driver receives data over the shared physical medium at step 520. This could include, for example, the MAC driver 308 receiving data link frames over the shared physical medium 104, extracting TCP/IP (or other) frames from the data link frames, and passing the TCP/IP (or other) frames to a higher layer, such as in the TCP/IP stack 310. The MAC driver 308 can determine that the slave device is not authorized to transmit in any suitable manner, such as by determining whether a token has been received from the master device.

When the MAC driver determines that the device operating in the slave mode is authorized to transmit at step 522, the MAC driver transmits data over the shared physical medium at step 524. This could include, for example, the MAC driver 308 receiving TCP/IP (or other) frames, wrapping the frames in data link frames, and passing the data link frames to the transceiver(s) 304 for transmission over the shared physical medium 104.

A device operating in the slave mode can also monitor the shared physical medium to detect a loss of a master device and, if appropriate, transition to the master role at step 526. This could include, for example, the MAC driver 308 detecting a loss of the clock signal or other signal from the current master device. In response to detecting the loss of the current master device, the MAC driver 308 could determine whether it should transition the device into the master role. As noted above, various techniques could be used to select a new master device, such as by transitioning the slave device having the next higher or lower network address into the master role.

Note that this represents examples of the types of operations that the MAC driver 308 could perform in a device 102*a*-102*n* operating in the slave role. Various other operations could also be performed by the slave device, such as anti-jabber, security/encryption, or other functions described above.

As shown in FIG. 6, the method 600 includes operating a MAC driver to control one or more transceivers at step 602 and controlling physical layer signaling and performing collision detection and avoidance using a physical layer logic device at step 604. This could include, for example, the processor 202 or controller 410 of any of the devices 102*a*-102*n* executing software or firmware instructions implementing the MAC driver 412. The MAC driver 412 operates to control the transmission and reception of signals by the transceivers 402-408 over the shared physical medium 104 via the logic device 414. This could also include the logic device 414 logically operating between the MAC driver 412 and the transceivers 402-408 to control the physical layer signaling in accordance with the MAC driver's signals and detect and avoid collisions.

The operations of the logic device can vary depending on whether the device is transmitting, receiving, or detecting a collision. For example, the logic device can receive data from the MAC driver for transmission at step 606 and control the transceiver(s) to transmit the data and one or more clock signals over the shared physical medium at step 608. This could include, for example, the logic device 414 verifying that no incoming transmissions are being received and controlling at least some of the transceivers 402-408 to transmit outgoing signals. The outgoing signals could include a clock signal, a transmit enable signal identifying the device, and one or more data signals.

The logic device can also receive data and clock signals from the shared physical medium at step 610 and provide the data to the MAC driver at step 612. This could include, for example, the logic device 414 receiving incoming signals, which could include a clock signal, a transmit enable signal identifying another device, and one or more data signals.

In addition, the logic device can detect a collision at step 614 and take corrective action at step 616. This could include, for example, the logic device 414 detecting that it is attempting to transmit data while another device is attempting to transmit data over the shared physical medium 104. The logic device 414 could then signal the MAC driver 412 that the current transmission has been interrupted, and the logic device 414 or the MAC driver 412 could implement a back-off timer or other mechanism for selecting a new transmission time.

Note that this represents examples of the types of operations that the logic device 414 could perform in a device 102*a*-102*n*. Various other operations could also be performed by the logic device 414, such as anti-jabber, security/encryption, or other functions described above.

Although FIGS. 5 and 6 illustrate examples of methods for enabling communications on a shared physical medium with multi-drop capability, various changes may be made to FIGS. 5 and 6. For example, while each figure shows a series of steps, various steps in each figure could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(1) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one transceiver configured to transmit or receive at least one clock signal and at least one data signal over a shared physical medium, the shared physical medium comprising a bus configured to be coupled to multiple devices including the apparatus and providing a multi-drop capability, the at least one transceiver configured to transmit or receive the signals at a rate of more than 10 megabits per second (Mbps), wherein the at least one transceiver operates in one of a master mode or a slave mode, the at least one transceiver transmits the at least one clock signal when in the master mode and receives the at least one data signal when in the slave mode; and
a media access control (MAC) driver configured to exchange network layer data over the shared physical medium,
wherein the MAC driver is configured to:
receive data link frames sent over the shared physical medium,
extract the TCP/IP packets from the data link frames,
send the TCP/IP packets to a TCP/IP stack,
wrap outbound TCP/IP packets from the TCP/IP stack in the data link frames that are sent over the shared physical medium,
determine that the apparatus is not functioning in the master mode, and
cause the at least one transceiver to receive the at least one clock signal over the shared physical medium and use an inter-frame gap to allow the multiple devices to synchronize its operation with the bus.

2. The apparatus of claim 1, wherein the MAC driver is configured to:
determine that the apparatus is functioning in the master mode; and
cause the at least one transceiver to transmit the at least one clock signal over the shared physical medium in response to determining that the apparatus is functioning in the master mode.

3. The apparatus of claim 2, wherein the MAC driver is further configured to send a token to other devices over the shared physical medium when functioning in the master mode, the token allowing the other devices to transmit data over the shared physical medium.

4. The apparatus of claim 1, wherein the at least one transceiver comprises at least one multipoint low-voltage differential signaling (M-LVDS) transceiver.

5. A method comprising:
transmitting or receiving at least one clock signal and at least one data signal over a high-speed shared physical medium using at least one transceiver, the shared physical medium comprising a bus coupled to multiple devices and providing a multi-drop capability, the at least one transceiver configured to transmit or receive the signals at a rate of more than 10 megabits per second (Mbps), wherein the at least one transceiver operates in one of a master mode or a slave mode, the at least one transceiver transmits the at least one clock signal when in the master mode and receives the at least one data signal when in the slave mode;
exchanging network layer data over the shared physical medium using a media access control (MAC) driver;
receiving data link frames sent over the shared physical medium;
extracting the TCP/IP packets from the data link frames;
sending the TCP/IP packets to a TCP/IP stack;
wrapping outbound TCP/IP packets from the TCP/IP stack in the data link frames that are sent over the shared physical medium;
determining that the apparatus is not functioning in the master mode, and
causing the at least one transceiver to receive the at least one clock signal over the shared physical medium and use an inter-frame gap to allow the multiple devices to synchronize its operation with the bus.

6. The method of claim 5, further comprising:
identifying the devices coupled to the bus using the MAC driver when the MAC driver is operating in a device in the master mode.

7. The method of claim 5, wherein the shared physical medium comprises an electrical or optical medium.

8. The method of claim 5, wherein the at least one transceiver supports multiple channels configured to be coupled to different numbers of conductors in the shared physical medium and provide an adjustable bandwidth.

9. The method of claim 5, wherein the at least one transceiver is configured to transmit or receive the signals at a rate of more than 100 Mbps.

10. An apparatus comprising:
at least one transceiver configured to transmit or receive at least one data signal over a shared physical medium, the shared physical medium comprising a bus configured to be coupled to multiple devices including the apparatus and providing a multi-drop capability, the at least one transceiver configured to transmit or receive the at least one data signal at a rate of more than 10 megabits per second (Mbps), wherein the at least one transceiver operates in one of a master mode or a slave mode, the at least one transceiver transmits the at least one clock signal when in the master mode and receives the at least one data signal when in the slave mode;
a media access control (MAC) driver configured to control transmissions and receptions of network layer data over the shared physical medium by the at least one transceiver, wherein the MAC driver is configured to:
receive data link frames sent over the shared physical medium,
extract the TCP/IP packets from the data link frames,
send the TCP/IP packets to a TCP/IP stack,
wrap outbound TCP/IP packets from the TCP/IP stack in the data link frames that are sent over the shared physical medium,
determine that the apparatus is not functioning in the master mode, and
cause the at least one transceiver to receive the at least one clock signal over the shared physical medium and use an inter-frame gap to allow the multiple devices to synchronize its operation with the bus; and
a logic device configured to control physical layer signaling and interface with the MAC driver, the logic device configured to enable the transmissions and receptions of the network layer data on the shared physical medium and to implement collision detection and avoidance.

11. The apparatus of claim 10, wherein the MAC driver is configured to interface with an Industrial Internet of Things (IIOT) protocol stack.

12. The apparatus of claim 10, wherein the logic device comprises at least one of: a field programmable gate array (FPGA), an application specific integrated circuit (ASIC), a complex programmable logic device (CPLD), discrete digital logic, and a microcontroller.

13. The apparatus of claim 10, wherein an interface between the logic device and the MAC driver comprises at least one of: a Media Independent Interface (MII), a Reduced Media Independent Interface (RMII), a Gigabit Media Independent Interface (RMII), a Serial Peripheral Interface (SPI), and a Universal Asynchronous Receiver/Transmitter (UART) interface.

14. The apparatus of claim 10, wherein:
the at least one transceiver comprises at least one multipoint low-voltage differential signaling (M-LVDS) transceiver; and
the at least one transceiver is configured to transmit or receive the at least one data signal at a rate of more than 100 Mbps.

15. A method comprising:
transmitting or receiving at least one data signal over a high-speed shared physical medium using at least one transceiver, the shared physical medium including a bus coupled to multiple devices and providing a multi-drop capability, the at least one transceiver configured to transmit or receive the at least one data signal at a rate of more than 10 megabits per second (Mbps), wherein the at least one transceiver operates in one of a master mode or a slave mode, the at least one transceiver transmits the at least one clock signal when in the master mode and receives the at least one data signal when in the slave mode;
controlling transmissions and receptions of network layer data over the shared physical medium by the at least one transceiver using a media access control (MAC) driver;
receiving data link frames sent over the shared physical medium;
extracting the TCP/IP packets from the data link frames;
sending the TCP/IP packets to a TCP/IP stack;
wrapping outbound TCP/IP packets from the TCP/IP stack in the data link frames that are sent over the shared physical medium;
determining that the apparatus is not functioning in the master mode;
causing the at least one transceiver to receive the at least one clock signal over the shared physical medium and use an inter-frame gap to allow the multiple devices to synchronize its operation with the bus and
enabling the transmissions and receptions of the network layer data on the shared physical medium using a logic device that controls physical layer signaling, interfaces with the MAC driver, and implements collision detection and avoidance.

16. The method of claim 15, further comprising:
performing a bridging function using the logic device to communicatively couple the shared physical medium to a second shared physical medium, the shared physical media using a common communication protocol and a common transmission scheme.

17. The method of claim 15, further comprising:
performing a translation function using the logic device to communicatively couple the shared physical medium to a second shared physical medium, the shared physical media using different communication protocols or different transmission schemes.

18. The method of claim 15, further comprising:
buffering the shared physical medium using the logic device.

19. The method of claim 15, further comprising:
using the logic device, executing at least one of: a frame integrity check, a retry mechanism, an anti jabber function, an encryption function, and a diagnostic function.

* * * * *